(12) United States Patent
Cho

(10) Patent No.: US 11,662,645 B2
(45) Date of Patent: May 30, 2023

(54) MULTI-STAGE PROBABILISTIC SIGNAL SHAPING

(71) Applicant: Nokia Solutions and Networks OY, Espoo (FI)

(72) Inventor: Joon Ho Cho, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 311 days.

(21) Appl. No.: 17/015,226

(22) Filed: Sep. 9, 2020

(65) Prior Publication Data

US 2022/0075239 A1 Mar. 10, 2022

(51) Int. Cl.
| | |
|---|---|
| *H04B 10/50* | (2013.01) |
| *G02F 1/383* | (2006.01) |
| *H01S 3/00* | (2006.01) |
| *H04B 14/02* | (2006.01) |
| *H04L 27/34* | (2006.01) |
| *H04B 10/516* | (2013.01) |
| *H04B 10/25* | (2013.01) |

(52) U.S. Cl.
CPC ............ *G02F 1/383* (2013.01); *H01S 3/0057* (2013.01); *G02F 2203/26* (2013.01); *H04B 10/25* (2013.01); *H04B 10/516* (2013.01); *H04B 14/023* (2013.01); *H04L 27/3405* (2013.01)

(58) Field of Classification Search
None
See application file for complete search history.

(56) References Cited

U.S. PATENT DOCUMENTS

| | | | | |
|---|---|---|---|---|
| 7,580,427 | B2 * | 8/2009 | Yun ....................... | H04L 1/0002 370/537 |
| 9,240,892 | B1 * | 1/2016 | Bicknell ................. | H04B 3/04 |
| 10,091,046 | B1 * | 10/2018 | Lefevre .................. | H04L 27/36 |
| 10,200,231 | B1 | 2/2019 | Lefevre et al. | |
| 10,523,400 | B2 | 12/2019 | Lefevre et al. | |

(Continued)

OTHER PUBLICATIONS

Amari, Abdelkerim, et al. "Introducing Enumerative Sphere Shaping for Optical Communication Systems with Short Blocklengths." arXiv preprint arXiv:1904.06601v4 (2019): 1-10.

(Continued)

*Primary Examiner* — Pranesh K Barua
(74) *Attorney, Agent, or Firm* — Mendelsohn Dunleavy, P.C.; Steve Mendelsohn; Yuri Gruzdkov

(57) ABSTRACT

A shaping encoder capable of improving the performance of PCS in nonlinear optical channels by performing the shaping in two or more stages. In an example embodiment, a first stage employs a shaping code of a relatively short block length, which is typically beneficial for nonlinear optical channels but may cause a significant penalty in the energy efficiency. A second stage then employs a shaping code of a much larger block length, which significantly reduces or erases the penalty associated with the short block length of the first stage while providing an additional benefit of good performance in substantially linear optical channels. In at least some embodiments, the shaping encoder may have relatively low circuit-implementation complexity and/or relatively low cost and provide relatively high energy efficiency and relatively high shaping gain for a variety of optical channels, including but not limited to the legacy dispersion-managed fiber-optic links.

23 Claims, 8 Drawing Sheets

(56) References Cited

U.S. PATENT DOCUMENTS

| | | | |
|---|---|---|---|
| 10,727,951 B2 | 7/2020 | Cho | |
| 10,972,215 B2* | 4/2021 | Cho | H04B 10/808 |
| 11,082,266 B2* | 8/2021 | Razzetti | H04B 10/541 |
| 2011/0075758 A1* | 3/2011 | Nam | H04L 1/007 |
| | | | 375/295 |
| 2018/0026725 A1* | 1/2018 | Cho | H04B 10/564 |
| | | | 714/776 |
| 2018/0131549 A1* | 5/2018 | Berardinelli | H04L 27/2605 |

OTHER PUBLICATIONS

Goossens Sebastiaan, et al. "First Experimental Demonstration of Probabilistic Enumerative Sphere Shaping in Optical Fiber Communications." arXiv preprint arXiv:1908.00453v2 (2019): 1-4.

Gültekin, Yunus Can, et al., "Approximate Enumerative Sphere Shaping," 2018 IEEE International Symposium on Information Theory (ISIT) (2018): 676-680.

Sun, Han, et al. "800G DSP ASIC Design Using Probabilistic Shaping and Digital Sub-Carrier Multiplexing." Journal of Lightwave Technology 38.17 (2020): 4744-4756.

Schulte, Patrick, et al. "Constant Composition Distribution Matching." IEEE Transactions on Information Theory 62.1 (2016): 430-434.

\* cited by examiner

100

142

320

310

| MODULATION | KURTOSIS |
|---|---|
| UNIFORM QPSK | 0 |
| PS 16-QAM, H = 0.2 | 0.31 |
| PS 16-QAM, H = 0.4 | 0.44 |
| PS 16-QAM, H = 0.6 | 0.43 |
| PS 16-QAM, H = 0.8 | 0.34 |
| UNIFORM 16-QAM | 0.16 |

510

600

700

| ALL POSSIBLE AMPLITUDE SEQUENCES FOR $m=2$ AND $n_1=4$ |
|---|
| 1111 |
| 1113 |
| 1131 |
| 1311 |
| 3111 |
| 1133 |
| 1331 |
| 3311 |
| 1313 |
| 1331 |
| 3113 |
| 3131 |
| 1333 |
| 3133 |
| 3313 |
| 3331 |
| 3333 |

| SEQUENCES SATISFYING $E_1 = 20$ | |
|---|---|
| 1111 | NO "3"s |
| 1113 | |
| 1131 | ONE "3" |
| 1311 | |
| 3111 | |
| 1133 | |
| 1331 | |
| 3311 | TWO "3"s |
| 1313 | |
| 1331 | |
| 3113 | |
| 3131 | |
| 1333 | |
| 3133 | |
| 3313 | NOT USED |
| 3331 | |
| 3333 | |

MULTI-STAGE PROBABILISTIC SIGNAL SHAPING

BACKGROUND

Field

Various example embodiments relate to optical communication equipment and, more specifically but not exclusively, to signal encoders and decoders.

Description of the Related Art

This section introduces aspects that may help facilitate a better understanding of the disclosure. Accordingly, the statements of this section are to be read in this light and are not to be understood as admissions about what is in the prior art or what is not in the prior art.

Probabilistic signal shaping can beneficially provide energy savings often referred to as the shaping gain. In a typical implementation of probabilistic signal shaping (e.g., probabilistic constellation shaping, PCS), constellation symbols of relatively large energy are transmitted less frequently than constellation symbols of relatively small energy. For a linear communication channel, the shaping gain can theoretically approach 1.53 dB.

SUMMARY OF SOME SPECIFIC EMBODIMENTS

Disclosed herein are various embodiments of a shaping encoder capable of improving the performance of PCS in nonlinear optical channels by performing the shaping in two or more stages. In an example embodiment, a first stage employs a shaping code of a relatively short block length, which is typically beneficial for nonlinear optical channels but may cause a significant penalty in the energy efficiency. A second stage then employs a shaping code of a much larger block length, which significantly reduces or erases the penalty associated with the short block length of the first stage while providing an additional benefit of good performance in substantially linear optical channels. As a result, various embodiments may beneficially be used for both linear and nonlinear optical channels.

In some embodiments, a shaping encoder may employ an electronic codebook that enables encoding equivalent to that of a two-stage shaping encoder to be performed using a corresponding search-and-match operation.

In at least some embodiments, the disclosed shaping encoder(s) may have relatively low circuit-implementation complexity and/or relatively low cost and provide relatively high energy efficiency and relatively high shaping gain for a variety of optical channels, including but not limited to the legacy dispersion-managed fiber-optic links.

According to an example embodiment, provided is an apparatus, comprising: a digital encoder having, at least, first and second digital stages to produce a stream of symbols from a bitstream, the first digital stage being configured to separately encode segments of a same number of bits of the bitstream into first sequences of symbols such that each of the first sequences has a same first length and a respective total energy of the symbols therein lower than a threshold, the second digital stage being configured to encode blocks of the first sequences into second sequences of symbols, each of the blocks having a same number of first sequences therein, each of the second sequences having a same second length; and wherein a total energy of symbols of any of the second sequences divided by the second length is smaller than the threshold divided by the first length.

According to another example embodiment, provided is an apparatus comprising an optical data transmitter that comprises an optical front end and a digital shaping encoder, the digital shaping encoder being configured to: encode a bitstream into a stream of symbols of a constellation; and cause the optical front end to produce a modulated optical signal carrying the stream of symbols; and wherein the digital shaping encoder is configured to generate a symbol sequence for the stream in response to a segment of the bitstream, the symbol sequence including an integer number of non-overlapping subsequences of a fixed length, any one of the subsequences having a transmit energy not exceeding a first threshold energy, the symbol sequence having a transmit energy not exceeding a second threshold energy and being generated such that some symbols of higher energy have a lower probability of being generated by the digital shaping encoder than other symbols of lower energy, the first threshold energy being smaller than an average energy of an unshaped sequence of the fixed length of the symbols of the constellation, the second threshold energy being smaller than the integer number of the first threshold energies, the integer number being greater than one.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Herein, the generation and/or transmission of a symbol stream in which various symbols appear with different probabilities even though the various input data segments encoded onto said symbol stream have about equal probabilities is referred to as probabilistic constellation shaping (PCS). Often, preferable types of PCS generate symbol streams in which higher energy symbols are less probable than lower energy symbols. In some embodiments, forward-error-correction (FEC) encoding may be used in a manner that causes such energy shaping to be largely maintained in the corresponding FEC-encoded symbol stream. In embodiments of coherent optical fiber communication systems and optical data transmitters and receivers thereof, the PCS can advantageously be used, e.g., (i) to lower degradations related to nonlinear optical effects, which are more prominent at larger energies, (ii) to lower a required signal-to-noise ratio (SNR) for a given transmission distance, and/or (iii) to enable higher information communication rates. Various embodiments may apply the PCS to various quadrature amplitude modulation (QAM) constellations and/or other suitable symbol constellations.

An important benefit of probabilistic signal shaping is that the amount of shaping (e.g., specific characteristics of the corresponding shaping code) can be selected to optimize a desired set of performance characteristics of any given communication channel. For example, depending on specified performance requirements, probabilistic signal shaping can be adjusted to achieve an optimal (e.g., the highest) spectral efficiency or an optimal (e.g., the highest) net bit-rate for any given transmission distance.

Figure 1:
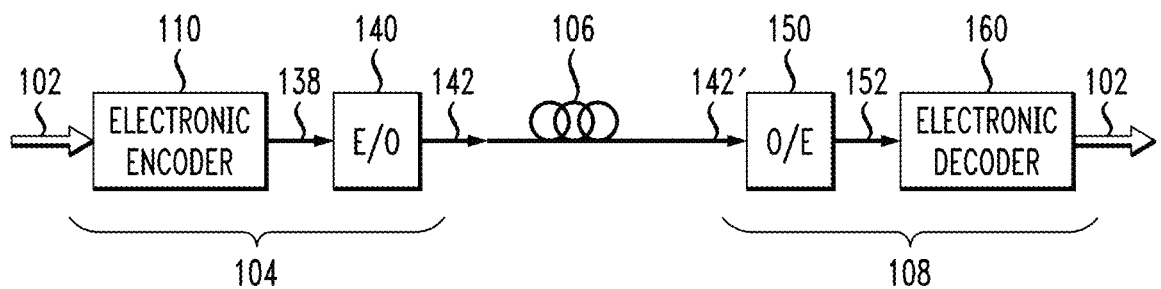
FIG. 1 shows a block diagram of a communication system in which various embodiments can be practiced.

FIG. 1 shows a block diagram of a communication system 100 in which various embodiments can be practiced. System 100 comprises an optical data transmitter 104 and an optical data receiver 108 that are coupled to one another by way of a communication link 106. In an example embodiment, communication link 106 can be implemented using one or more spans of optical fiber or fiber-optic cable.

System 100 carries out PCS using (i) an electronic encoder 110 appropriately interfaced with an electrical-to-optical (E/O) converter (also sometimes referred-to as the optical transmitter front end) 140 at transmitter 104, and (ii) an optical-to-electrical (O/E) converter (also sometimes referred-to as the optical receiver front end) 150 appropriately interfaced with an electronic decoder 160 at receiver 108.

In an example embodiment, one or both of electronic encoder 110 and electronic decoder 160 can be implemented using a respective digital signal processor (DSP) or a portion thereof.

Electronic encoder 110 operates to generate one or more electrical radio-frequency (RF) signals 138 in response to receiving input data 102. In response to electrical RF signal(s) 138, the optical modulator(s) of the E/O converter 140 then generate(s) a corresponding modulated optical signal 142 suitable for transmission over link 106 and having encoded thereon a segment of the stream of input data 102. In an example embodiment, E/O converter 140 comprises an optical modulator that can be implemented as known in the pertinent art, e.g., using: (i) a laser configured to generate an optical carrier wave; (ii) one or more modulator configured to generate modulated optical signal 142 by modulating the optical carrier wave generated by the laser; and (iii) one or more driver circuits, e.g., analog electrical circuits, configured to electrically drive the modulator(s) using electrical RF signal(s) 138, thereby causing the E/O converter 140 to generate modulated optical signal 142. Depending on the embodiment, the optical modulator(s) used in E/O converter 140 can be implemented using one or more optical IQ modulators, Mach-Zehnder modulators, amplitude modulators, phase modulators, and/or intensity modulators. The optical modulators may also be nested to generate a modulated optical carrier whose orthogonal polarization components are separately modulated. In some embodiments, E/O converter 140 may employ directly modulated lasers, e.g., laser diodes configured to generate modulated optical signals in response to modulated electrical currents that drive the diodes.

Communication link 106 typically imparts noise and other linear and/or nonlinear signal impairments onto signal 142 and delivers a resulting impaired (e.g., noisier) signal 142' to O/E converter 150 of receiver 108. O/E converter 150 operates to convert optical signal 142' into one or more corresponding electrical RF signals 152. Electronic decoder 160 then uses decoding processing to recover data 102 from the electrical RF signal(s) 152.

In some embodiments, O/E converter 150 comprises an optical demodulator that can be configured, as known in the pertinent art, for coherent (e.g., intradyne or homodyne) detection of signal 142'. In such embodiments, O/E converter 150 may include: (i) an optical local-oscillator (LO) source; (ii) an optical hybrid configured to optically mix signal 142' and the LO signal generated by the optical LO source; and (iii) one or more photodetectors (e.g., photodiodes) configured to convert optical interference signals generated by the optical hybrid into the corresponding components of electrical RF signal(s) 152.

In some other embodiments, O/E converter 150 comprises an optical demodulator that can be configured for direct (e.g., square law, intensity, optical power) detection of signal 142'. In such embodiments, O/E converter 150 may include a photodiode configured to generate electrical RF signal 152 to be proportional to the intensity (optical power, squared amplitude of the electric field) of signal 142', i.e., without mixing the received signal 142' with light of a local optical source.

Figure 2:
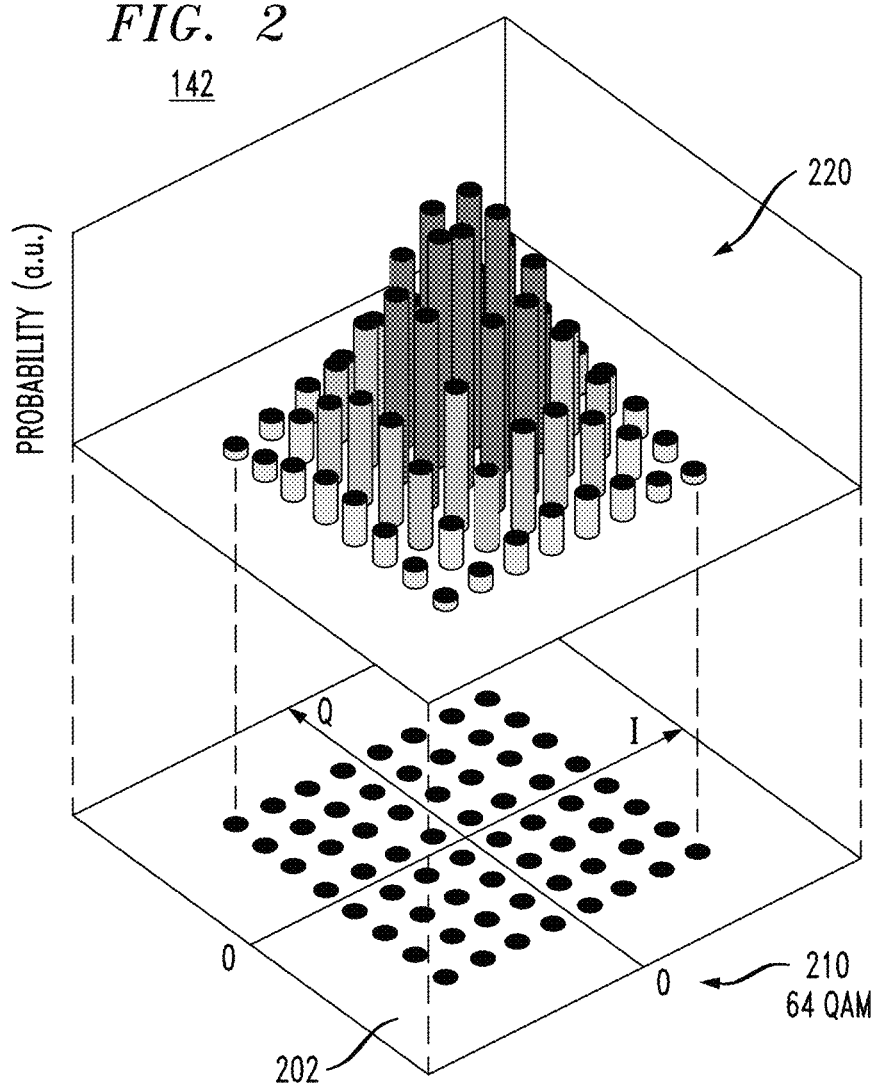
FIG. 2 graphically illustrates certain characteristics of an example modulated optical signal that can be transmitted in the communication system of FIG. 1 according to an embodiment.

FIG. 2 graphically illustrates certain characteristics of an example optical signal 142 that can be transmitted in communication system 100 (FIG. 1) according to an embodiment. In this particular example, optical data transmitter 104 is configured to generate optical signal 142 using a 64-QAM constellation 210, the constellation symbols of which are shown as points on an IQ plane 202, wherein the I and Q coordinate axes are the in-phase and quadrature-phase dimensions, respectively, of the IQ plane. In an example embodiments, the constellation-symbol amplitudes in constellation 210 in each of the I and Q dimensions thereof can be represented by the integers $-7$, $-5$, $-3$, $-1$, $+1$, $+3$, $+5$, and $+7$.

A three-dimensional (3D) bar chart 220 also shown in FIG. 2 graphically illustrates relative probability of occurrence of the different constellation symbols of constellation 210 in optical signal 142. In particular, chart 220 indicates that electronic encoder 110 may operate to generate a constellation-symbol stream for being carried by optical signal 142 such that constellation symbols of a first transmit energy occur with higher probability than constellation symbols of a second transmit energy that is greater than the first transmit energy.

Figure 3B:
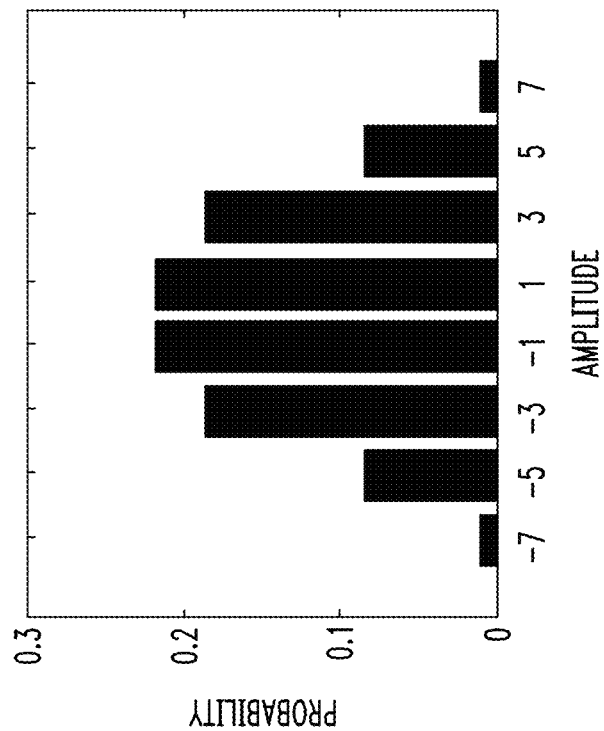
FIGS. 3A-3B graphically illustrate example probability distributions that can be applied to an 8-ary Pulse-Amplitude-Modulation (8-PAM) constellation in the communication system of FIG. 1 in some embodiments.
Figure 3A:
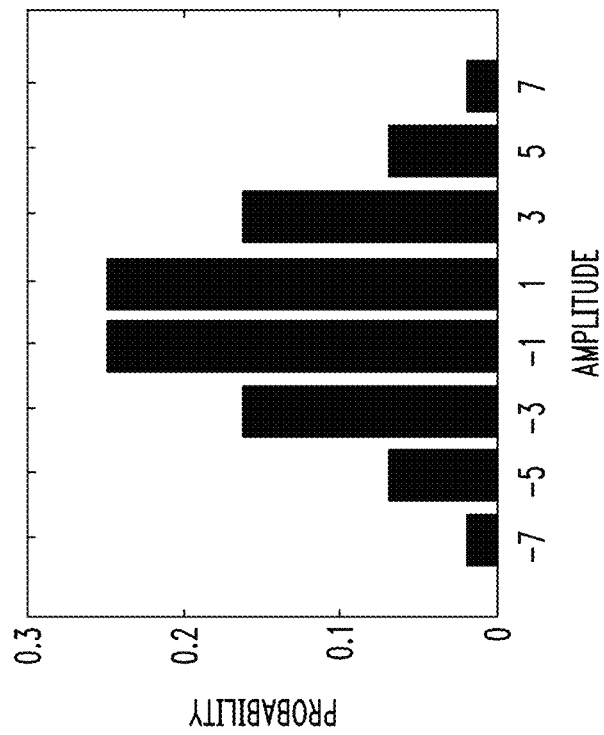

FIGS. 3A-3B graphically illustrate example probability distributions that can be applied by electronic encoder 110 to the I or Q dimension of constellation 210 in some embodiments. Distribution 310 shown in FIG. 3A is a Maxwell-Boltzmann (MB) distribution that can be expressed using Eq. (1):

$$P \propto \exp(-\lambda \cdot |x|^2) \quad (1)$$

where P is the probability of a constellation symbol; x is the amplitude of the constellation symbol in the I or Q dimension of the IQ plane 202; and λ is a positive real value. The value of λ is related to the rate H (e.g., entropy) of the shaping code used in electronic encoder 110 and can be selected, e.g., based on a desired code-rate value. Distribution 320 shown in FIG. 3B is a generalized Maxwell-Boltzmann (GMB) distribution that can be expressed using Eq. (2):

$$P \propto \exp(-\lambda \sim |x|^\alpha) \quad (2)$$

where the parameter a is allowed to have any positive real value. The MB distribution is a special case of the GMB distribution, wherein α=2. In the GMB example shown in FIG. 3B, α=3.5. As the value of a increases above α=2, the GMB distribution becomes closer to a uniform distribution, e.g., as visually evident from a comparison of distributions 310 and 320 and the flatter middle portion of the latter. For the same shaping-code rate H, distribution 320 typically results in a larger average energy of optical signal 142 than distribution 310. For example, for H=2.6 bit/symbol, the average-energy difference between distributions 310 and 320 is approximately 0.15 dB.

Distributions 310 and 320 are also characterized by different respective values of kurtosis (hereafter denoted as K). More specifically, for H=2.6, distribution 310 has K=0.44, whereas distribution 320 has K=0.31. These kurtosis values have been calculated using the absolute-valued signals that have a positive mean value (or, equivalently, using only the positive portion of the constellation). Kurtosis values calculated without the absolute-value operator, e.g., for signals having the zero mean value, may be different.

In probability theory and statistics, kurtosis is a measure of the "tailedness" of the probability distribution of a real-valued variable. Kurtosis can be used, e.g., to quantify the shape of a probability distribution. Herein, kurtosis refers to the standardized fourth-order moment of the probability distribution.

Figures 4, 5:
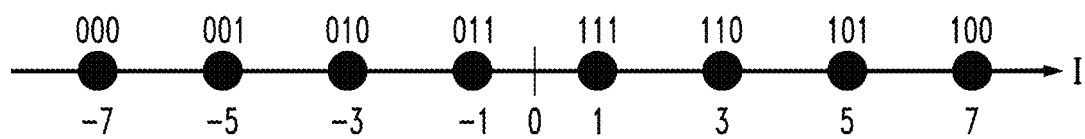
FIG. 4 shows a table of kurtosis values for several modulation formats that can be used in the communication system of FIG. 1 in some embodiments.
FIG. 5 graphically illustrates an 8-PAM constellation that can be used in the communication system of FIG. 1 according to an embodiment.

FIG. 4 shows a table of kurtosis values for several example modulation formats that can be used in system 100 in some embodiments. Therein, PS stands for "probabilistically shaped" and indicates the use of an MB distribution. The shown kurtosis values have been calculated using absolute-valued signals, as mentioned above. Different MB distributions corresponding to the different PS 16-QAM constellation entries in the table of FIG. 4 correspond to different respective values of A, which are manifested by the different respective values of the shaping-code rate H shown therein. The entries of the table of FIG. 4 indicate that, for the same constellation, e.g., 16-QAM, kurtosis can be a nonlinear function of the shaping-code rate H. The entries of the table further indicate that kurtosis may also depend on the constellation size.

For an additive white Gaussian noise (AWGN) channel, an optimal distribution of QAM constellation symbols may be an MB distribution, such as the distribution 310 (FIG. 3A). However, for at least some optical fiber channels, a nonlinear interference noise (NLIN) may also be present in addition to the AWGN. If optical-signal power increases, then the NLIN increases. If kurtosis increases, then the NLIN increases. As such, kurtosis of the employed modulation format may be used as an approximate measure of the relative amount of NLIN in the corresponding optical channel. However, it should be noted that, for a given modulation format, kurtosis does not vary with the optical-signal power. Both AWGN and NLIN detrimentally reduce the effective SNR at the receiver.

As illustrated by the table of FIG. 4, at least some MB distributions may have higher kurtosis values than the corresponding uniform distribution(s). As a result, the use of MB distributions in some communication systems, e.g., systems employing highly nonlinear optical fiber links, such as the legacy dispersion-managed links that are typically operated with a relatively high optical launch power, may impose a significant SNR penalty on the received optical signal, e.g., optical signal 142' (see FIG. 1), due to the NLIN. At least some GMB distributions may in some cases reduce the SNR penalty with respect to that of the corresponding MB distribution(s), e.g., as indicated by the above-mentioned kurtosis values corresponding to distributions 310 and 320.

FIG. 5 graphically illustrates an 8-ary Pulse-Amplitude-Modulation (8-PAM) constellation 510 that can be used to program electronic encoder 110 according to an embodiment. The eight constellation points of constellation 510 are all located on the I-axis of the I-Q plane. Each of the constellation points is used to encode three bits. An example of 3-bit bit-words assigned to different constellation points of constellation 510 is shown above the I-axis in FIG. 5. The relative amplitudes corresponding to the different constellation points of constellation 510 are shown below the I-axis in FIG. 5 and can be represented by the integers −7, −5, −3, −1, +1, +3, +5, and +7.

In the illustrated embodiment, the constellation-point labeling is in accordance with a reflected double-Gray mapping scheme, in which the constellation points located in the positive I-half of constellation 510 have binary-amplitude labels (i.e., the labels that do not include the sign bit) generated using conventional double-Gray mapping, while the constellation points located in the negative I-half of the constellation have binary labels generated by flipping the sign bits of the corresponding constellation points located in the positive I-half. With this type of mapping, the amplitude labels of the constellation points are symmetric, and the sign bits of the constellation points are anti-symmetric with respect to the origin of the I-axis.

In some alternative embodiments, a similar approach can be used to generate binary labels (i.e., assigned bit-words) for a constellation or a constellation portion that uses the Q dimension of the complex I-Q plane. For example, constellation-point labeling for the 64-QAM constellation 210 (FIG. 2) can be implemented using the labeling shown in FIG. 5, with such labeling being applied to both I and Q dimensions of constellation 210.

For illustration purposes and without any implied limitations, the description of some example embodiments is given herein below in reference to a 4-PAM constellation. A 4-PAM constellation is similar to constellation 510, but has four distinct constellation points distributed along a 1-dimensional line. Herein, we assume that the constellation points are arranged equidistantly with respect to each other and symmetrically around the origin (zero) and can be represented by the integers −3, −1, 1, and 3. An extension of the presented description to any $2^m$-PAM constellation is relatively straightforward, where m is an integer greater than one. Further extensions to other possible dimensions of optical signal 142, e.g., time, polarization, spatial mode, and frequency/wavelength, will be apparent to a person of ordinary skill in the pertinent art without any undue experimentation. For example, two $2^m$-PAM symbols can be combined to construct a $2^{2m}$-QAM symbol by modulating each of the I and Q dimensions of the optical signal 142 independently with a respective $2^m$-PAM symbol. A person of ordinary skill in the art will understand that, for example, the 64-QAM constellation 210 of FIG. 2 corresponds to m=3.

As an illustrative example, let us consider a single-stage shaping encoder that produces a length-n symbol sequence $X=[x_1 \ldots x_n]$ in response to a length-k binary sequence $B=[b_1 \ldots b_k]$. The total energy of the sequence X can be calculated as:

$$\|X\|^2 = \sum_{i=1}^{i=n} |x_i|^2 \qquad (3)$$

For example, for 4-PAM, if n=8 and X=[1, 1, 1, 1, 1, 3, 3, 3], then Eq. (3) results in $\|x\|^2=32$ (=1+1+1+1+1+9+9+9). In general, such a shaping encoder can be configured to apply a shaping code that, for a selected fixed n, can make the total energy $\|X\|^2$ of the sequence X to be not larger than a selected fixed threshold energy $E_{max}$, i.e., any sequence X of length n at the output of the shaping encoder fulfills the inequality:

$$\|X\|^2 \leq E_{max} < U_n \qquad (4)$$

where $U_n$ is the average energy of the unshaped length-n symbol sequence X, i.e., a sequence in which different constellation symbols occur with an approximately equal probability. For the above example of 4-PAM and n=8, said average energy is $U_n=40$.

Since Eq. (3) is analogous to the expression for the squared Euclidean norm of the vector $X=(x_1 \ldots x_n)$, wherein $x_1, \ldots, x_n$ are the Cartesian coordinates of the vector in the n-dimensional space, it can be said that all vectors X produced by such a shaping encoder are enclosed by the n-dimensional sphere of radius $\sqrt{E_{max}}$ centered on the origin of the coordinate system. Such shaping codes are sometimes referred to in the literature as "sphere shaping" codes. Representative examples of algorithms that can be adapted for implementing sphere shaping are described, e.g., in (1) Patrick Schulte, Georg Böcherer, "Constant Composition Distribution Matching," IEEE TRANSACTIONS ON INFORMATION THEORY, 2016, vol. 62, No. 1, pp. 430-434; and (2) Yunus Can Gültekin, et al., "Approximate Enumerative Sphere Shaping," 2018 IEEE International Symposium on Information Theory (ISIT), pp. 676-680, both of which are incorporated herein by reference in their entirety.

For a given constellation (e.g., 510, FIG. 5) and a fixed code rate H (=k/n bits per symbol), a sphere-shaping code produces a probability distribution whose kurtosis depends on the block length n of the code. For example, a shorter-length (e.g., length-$n_1$) sphere-shaping code typically produces a probability distribution with a smaller kurtosis than a longer-length (e.g., length-$n_2$, $n_2 > n_1$) sphere-shaping code. However, the shorter-length sphere-shaping code is typically less energy-efficient than the longer-length sphere-shaping code or a corresponding MB code. Circuit-implementation complexity typically increases with the block length n of the sphere-shaping code.

It would be desirable to provide, e.g., for communication system 100, a shaping encoder that has at least some of the following characteristics: (i) has relatively low circuit-implementation complexity and/or relatively low cost; (ii) results in relatively high energy efficiency for transmission of payload data; (iii) provides a relatively high shaping gain for NLIN-impaired optical channels while being also capable of providing good performance for substantially linear optical channels; (iv) lends itself to convenient interfacing with an FEC encoder; (v) enables optical-signal transmission over a relatively large distance, e.g., larger than the reach of the corresponding unshaped optical signal; and (iv) can support relatively high data throughput.

Figure 6:
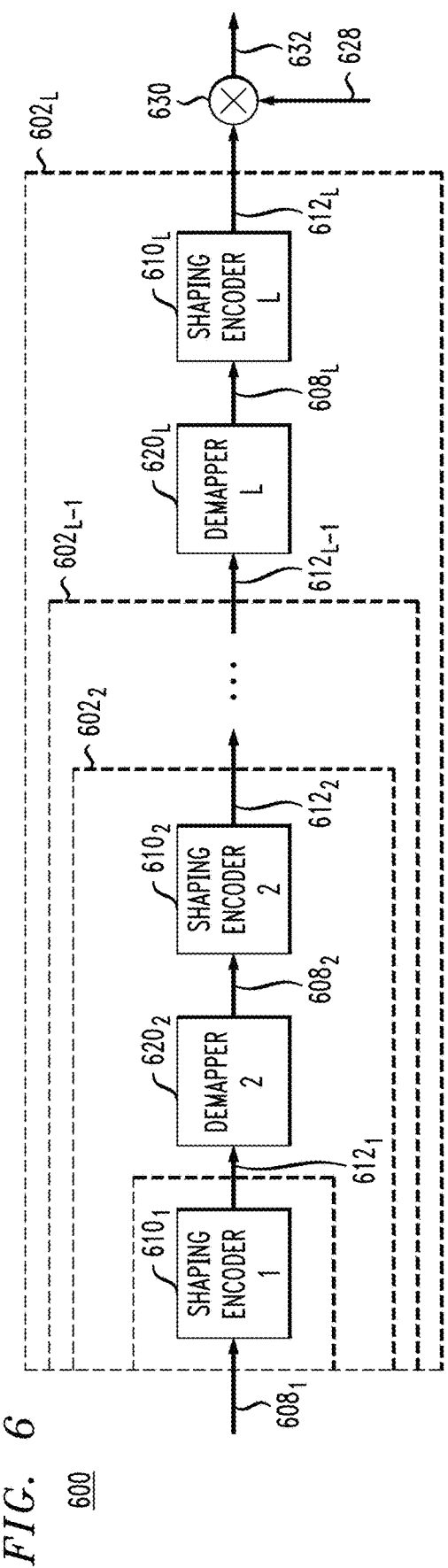
FIG. 6 shows a block diagram of a multistage shaping encoder that can be used in the communication system of FIG. 1 according to an embodiment.

FIG. 6 shows a block diagram of a multistage shaping encoder 600 that can be used in electronic encoder 110 according to an embodiment. Shaping encoder 600 has a nested architecture that is illustratively shown in FIG. 6 as comprising L nested stages $602_1$-$602_L$, where L is an integer greater than two. In some alternative embodiments, shaping encoder 600 may have only two stages, i.e., correspond to L=2. The first encoder stage $602_1$ comprises a shaping encoder $610_1$. Each subsequent encoder stage $602_i$ (where i=2, ..., L) comprises the previous encoder stage $602_{i-1}$ serially connected with a constellation demapper $620_i$ and a shaping encoder $610_i$. For example, encoder stage $602_2$ comprises encoder stage $602_1$ serially connected with constellation demapper $620_2$ and shaping encoder $610_2$, and so on.

For illustration purposes, multistage shaping encoder 600 is described below as having been programmed to use a $2^m$-PAM constellation, e.g., constellation 510 (FIG. 5).

In an example embodiment, shaping encoder $610_1$ operates to apply a first sphere-shaping code to an input bitstream $608_1$ to generate an output amplitude stream $612_1$ of positive amplitudes. The first sphere-shaping code has a rate $H_1=k_1/n_1$ and a threshold energy $E_1$ and is applied to bitstream $608_1$ in a segment-by-segment manner. More specifically, in response to a first received segment of $k_1$ bits of bitstream $608_1$, shaping encoder $610_1$ generates a corresponding sequence of $n_1$ positive amplitudes for amplitude stream $612_1$. In response to a next non-overlapping segment of $k_1$ bits of bitstream $608_1$, shaping encoder $610_1$ generates a corresponding next sequence of $n_1$ positive amplitudes for amplitude stream $612_1$, which is appended to the previously outputted sequence of $n_1$ positive amplitudes, and so on. Amplitude stream $612_1$ may include only the positive amplitudes of the operative $2^m$-PAM constellation. For example, if constellation 510 (FIG. 5) is the operative constellation, then amplitude stream $612_1$ may include only the amplitudes 1, 3, 5, and 7 (see FIG. 5). If the operative constellation is 4-PAM, then amplitude stream $612_1$ may include only the amplitudes 1 and 3. The first sphere-shaping code typically causes a smaller amplitude to occur in amplitude stream $612_1$ with a higher relative probability than a larger amplitude.

Demapper $620_2$ operates to convert amplitude stream $612_1$ into a corresponding bitstream $608_2$ using the amplitude bits of the binary labels of the corresponding constellation points. In the example of constellation 510 (FIG. 5), the amplitude bits are the two least significant bits (LSBs) of each binary label. In this case, each amplitude 1 is converted by demapper $620_2$ into the binary "11" for bitstream $608_2$; each amplitude 3 is converted by demapper $620_2$ into the binary "10" for bitstream $608_2$; each amplitude 5 is converted by demapper $620_2$ into the binary "01" for bitstream $608_2$; and each amplitude 7 is converted by demapper $620_2$ into the binary "00" for bitstream $608_2$.

Shaping encoder $610_2$ operates to apply a second sphere-shaping code to bitstream $608_2$ to generate an output amplitude stream $612_2$ of positive amplitudes. The second sphere-shaping code has a code rate $H_2=k_2/n_2$ and a threshold energy $E_2$ and is applied to bitstream $608_2$ in a segment-by-segment manner. More specifically, in response to a first segment of $k_2$ bits of bitstream $608_2$, shaping encoder $610_2$ generates a corresponding sequence of $n_2$ positive amplitudes for amplitude stream $612_2$. In response to a next non-overlapping segment of $k_2$ bits of bitstream $608_2$, shaping encoder $610_2$ generates a corresponding next sequence of $n_2$ positive amplitudes for amplitude stream $612_2$, which is appended to the previously outputted sequence of $n_2$ positive amplitudes, and so on. Similar to amplitude stream $612_1$, amplitude stream $612_2$ may include only the positive amplitudes of the operative $2^m$-PAM constellation. The second sphere-shaping code typically causes a smaller amplitude to occur in amplitude stream $612_2$ with a higher relative probability than a larger amplitude.

In some embodiments, the input block lengths for the first and second sphere-shaping codes may be the same, i.e., $k_1=k_2$.

In an example embodiment, $n_2>n_1$ and $n_2/n_1=\rho$, where $\rho$ is an integer greater than one. The threshold energy $E_2$ is selected such as to cause a segment of amplitude stream $612_2$ to have a smaller transmit energy than that of an equal-length segment of amplitude stream $612_1$, e.g., according to the following inequality:

$$E_2 < \rho E_1 \quad (5)$$

A functional relationship of any next stage $602_i$ with the corresponding preceding stage $602_{i-1}$ is generally analogous to the above-described functional relationship between the stages $602_2$ and $602_1$.

Demapper $620_L$ operates to convert amplitude stream $612_{L-1}$ received form stage $604_{L-1}$ into a corresponding bitstream $608_L$ using the amplitude bits of the binary labels of the corresponding constellation points. Shaping encoder $610_L$ operates to apply an L-th sphere-shaping code to bitstream $608_L$ to generate an output amplitude stream $612_L$ of positive amplitudes. The L-th sphere-shaping code has a rate $H_L=k_L/n_L$ and a threshold energy $E_L$ and is applied to bitstream $608_L$ in a segment-by-segment manner. The threshold energy $E_L$ is selected such as to cause a segment of amplitude stream $612_L$ to have a smaller transmit energy than that of an equal-length segment of amplitude stream $612_{L-1}$.

Shaping encoder 600 further comprises a multiplier 630 that operates to transform amplitude stream $612_L$ into a corresponding amplitude stream 632 carrying signed amplitudes, i.e., positive and negative amplitudes. The conversion is performed in response to a bitstream 628, in which binary "zeros" and "ones" have about equal probability of occurrence. In response to a binary "zero" received via bitstream 628, multiplier 630 multiplies the corresponding received amplitude of amplitude stream $612_L$ by −1, thereby outputting a negative amplitude for amplitude stream 632. In response to a binary "one" received via bitstream 628, multiplier 630 multiplies the corresponding received amplitude of amplitude stream $612_L$ by +1, thereby outputting a positive amplitude for amplitude stream 632. The resulting amplitude stream 632 can then be used to modulate the optical carrier, as already indicated above.

In some embodiments, at least some segments of bitstream 628 may include parity bits, e.g., generated by applying a suitable FEC code to bitstream $608_1$. In some embodiments, bitstream 628 can be generated using some of the methods and/or circuits disclosed in U.S. Pat. Nos. 10,727,951, 10,523,400, 10,200,231, and 10,091,046, all of which are incorporated herein by reference in their entirety.

In an example embodiment, appropriate selection of L sphere-shaping codes for the L stages of shaping encoder 600 advantageously enables amplitude stream 632 to have a probability distribution that has a desired value of kurtosis, e.g., a value that provides nearly optimal performance for a given communication link 106. In particular, the probability distribution of amplitude stream 632 can be adjusted, by changing the code selection, to properly mitigate the adverse effects of the given amounts of AWGN and NLIN in link 106.

In some embodiments, shaping encoder 600 can beneficially be implemented using a less-complex digital circuit than that of a comparable single-stage shaping encoder configured to realize a GMB distribution (see Eq. (2)).

Figure 7:
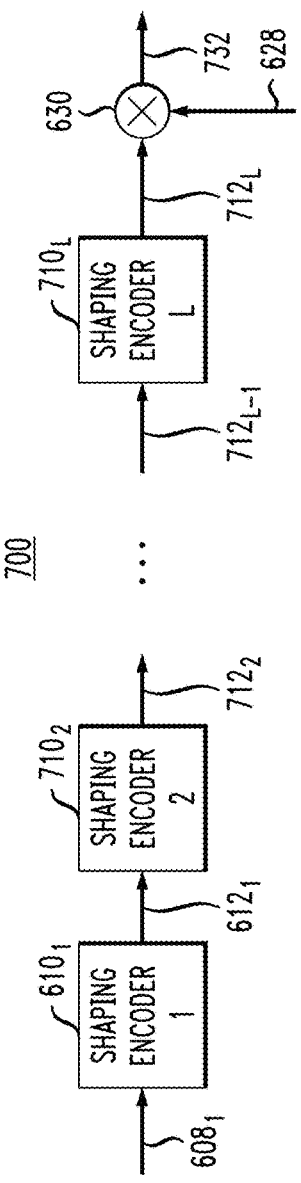
FIG. 7 shows a block diagram of a multistage shaping encoder that can be used in the communication system of FIG. 1 according to an alternative embodiment.

FIG. 7 shows a block diagram of a multistage shaping encoder 700 that can be used in electronic encoder 110 according to an alternative embodiment. Shaping encoder 700 has a serial architecture and is illustratively shown in FIG. 6 as comprising L serially connected shaping encoders $610_1$, $710_2$-$710_L$, where L is an integer greater than two. In some alternative embodiments, multistage shaping encoder 700 may have only two serially connected shaping encoders, i.e., encoders $610_1$, $710_2$ for L=2.

Shaping encoder $610_1$ is already described above in reference to FIG. 6. Each of shaping encoders $710_2$-$710_L$ differs from shaping encoder $610_1$ in that a shaping encoder 710 receives an amplitude stream and outputs another amplitude stream, whereas shaping encoder $610_1$ receives a bitstream and outputs an amplitude stream. For example, shaping encoder $710_2$ operates to apply a second sphere-shaping code to amplitude stream $612_1$ to generate an amplitude stream $712_2$ of positive amplitudes. The second sphere-shaping code has a fractional rate $R_2=n_1/n_2<1$ and a threshold energy $E_2$ and is applied to amplitude stream $612_1$ in a segment-by-segment manner. The threshold energy $E_2$ is selected such as to cause a segment of amplitude stream $712_2$ to have a smaller transmit energy than that of an equal-length segment of amplitude stream $612_1$.

Shaping encoder $710_L$ operates to apply an L-th sphere-shaping code to amplitude stream $712_{L-1}$ to generate an output amplitude stream $712_L$ of positive amplitudes. The L-th sphere-shaping code has a fractional rate $R_L=n_{L-1}/n_L<1$ and a threshold energy $E_L$ and is applied to amplitude stream $712_{L-1}$ in a segment-by-segment manner. The threshold energy $E_L$ is selected such as to cause a segment of amplitude stream $712_L$ to have a smaller transmit energy than that of an equal-length segment of amplitude stream $712_{L-1}$. That is, $$\frac{E_L}{n_L} < \frac{E_{L-1}}{n_{L-1}}.$$

Shaping encoder 700 further comprises a multiplier 630 that operates to transform amplitude stream $712_L$ into a corresponding amplitude stream 732 carrying signed amplitudes. The conversion is performed in response to bitstream 628, e.g., as already described above in reference to FIG. 6.

Figure 8:
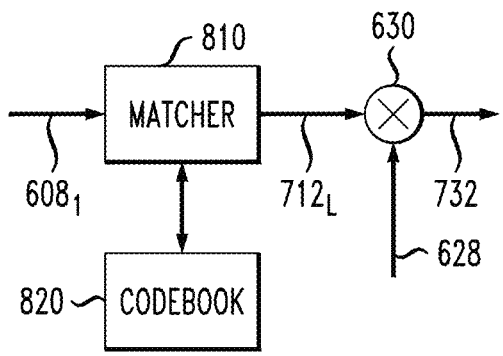
FIG. 8 shows a block diagram of a shaping encoder that can be used in the communication system of FIG. 1 according to yet another embodiment.

FIG. 8 shows a block diagram of a shaping encoder 800 that can be used in electronic encoder 110 according to yet another embodiment. Shaping encoder 800 implements the functionality of shaping encoder 700 using a segment matcher 810 and a codebook store 820. In operation, segment matcher 810 receives a length-$k_1$ segment of bitstream $608_1$, finds a match to this segment in codebook store 820, retrieves a corresponding length-$n_L$ amplitude sequence from the codebook store, and outputs the retrieved amplitude sequence to generate a length-$n_L$ segment for amplitude stream $712_L$.

Codebook store 820 has stored therein a shaping codebook constructed to compress the multistage encoding of shaping encoder 700 into a single search-and-match operation, but otherwise produces the same amplitude stream $712_L$ as shaping encoder 700 in response to the same bitstream $608_1$. In an example embodiment, a shaping codebook for codebook store 820 can be constructed, e.g., as described below in reference to an example shaping codebook 900 corresponding to a 4-PAM constellation (i.e., m=2), L=2, $k_1$=36, $n_1$=4, $n_2$=60, $E_1$=20, $E_2$=124, H=$k_1$/$n_2$=0.6 bit/amplitude. A person of ordinary skill in the pertinent art will be able to use a similar codebook-construction procedure to construct other shaping codebooks corresponding to other sets of the above-listed parameters.

FIGS. 9A-9D illustrate an example codebook-construction procedure that can be used to construct shaping codebook 900 for codebook store 820 according to an embodiment.

Figures 9A, 9B:
FIGS. 9A-9D illustrate an example codebook-construction procedure that can be used to construct a shaping codebook for the shaping encoder of FIG. 8 according to an embodiment.

FIG. 9A shows all possible length-4 amplitude sequences corresponding to m=2.

FIG. 9B illustrates a codebook-construction step in which the amplitude sequences of FIG. 9A are sorted and pruned to remove the sequences that do not satisfy the $E_1$=20 energy constraint, i.e., to remove the length-4 sequences for which $\|X\|^2$>20. The remaining sequences form a sequence set 910, which has N=11 different length-4 amplitude sequences.

Figure 9C:
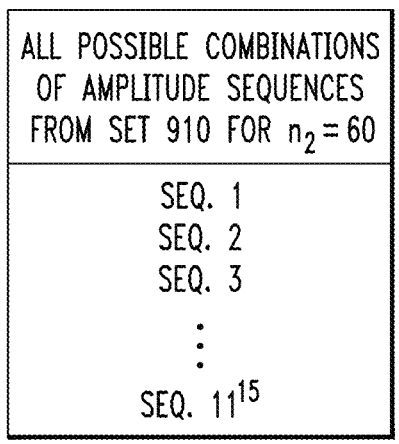

FIG. 9C illustrates a codebook-construction step in which all possible combinations of amplitude sequences from the set 910 (FIG. 9B) of length 60 are enumerated. The total number of such combinations is $11^{15}$=$N^C$, where C=$n_2$/$n_1$=15. In the decimal format, $11^{15}$ 4.18×$10^{15}$. This number of amplitude sequences can be used to encode $\lfloor \log_2 11^{15} \rfloor$=51 bits.

Figure 9D:
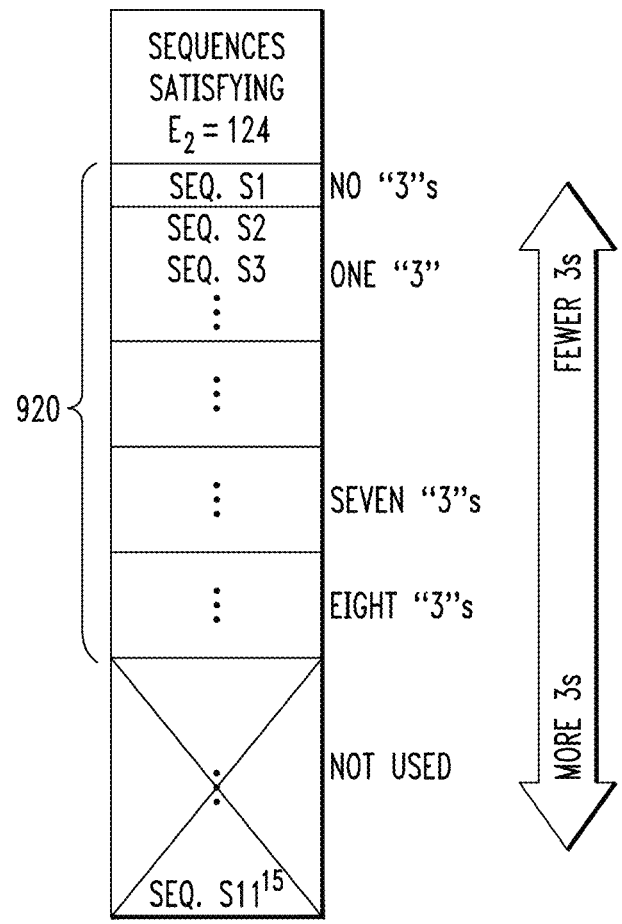

FIG. 9D illustrates a codebook-construction step in which the amplitude sequences of FIG. 9C are sorted and pruned to remove the amplitude sequences that do not satisfy the $E_2$=124 energy constraint, i.e., to remove the length-60 amplitude sequences for which $\|X\|^2$>124. Some more length-60 amplitude sequences for which $\|X\|^2$=124 may need to be removed from the sorted list of amplitude sequences to limit the remaining number of amplitude sequences in a set 920 exactly to $2^{36}$≈6.87×$10^{10}$. These remaining amplitude sequences can then be mapped, one-to-one, to $2^{36}$ different length-36 bit sequences in any suitable manner. The resulting mapping of $2^{36}$ different length-36 bit sequences to $2^{36}$ different length-60 amplitude sequences can serve as shaping codebook 900, which can be loaded into the codebook store 820 (FIG. 8) and used as described above.

Figure 10:
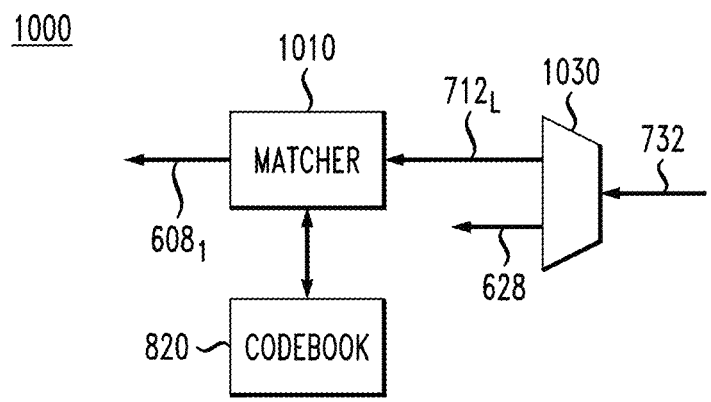
FIG. 10 shows a block diagram of a shaping decoder that can be used in the communication system of FIG. 1 according to an embodiment.

FIG. 10 shows a block diagram of a shaping decoder 1000 that can be used in electronic decoder 160 according to an embodiment. Shaping decoder 1000 is compatible with shaping encoders 700 and 800 and performs amplitude-sequence decoding that is inverse to the encoding performed by shaping encoders 700 and 800. For example, in response to amplitude stream 732 received from the upstream circuitry of receiver 108, shaping decoder 1000 operates to recover bitstream $608_1$, as indicated in FIG. 10.

Shaping decoder 1000 comprises a demultiplexer 1030, a sequence matcher 1010, and a copy of codebook store 820. Demultiplexer 1030 operates to demultiplex amplitude stream 732 (which carries signed amplitudes, as explained above in reference to FIGS. 7, 8) into bitstream 628 (which carries sign bits of the signed amplitudes) and amplitude stream $712_L$ (which carries unsigned amplitudes). Sequence matcher 1010 operates to receive a length-$n_L$ amplitude sequence of amplitude stream $712_L$, finds a match to this sequence in codebook store 820, retrieves a corresponding length-$k_1$ bit-word from the codebook store, and outputs the retrieved bit-word to generate a length-$k_1$ segment for bitstream $608_1$.

The codebook store 820 of shaping decoder 1000 has therein the same shaping codebook as that of the codebook store 820 of the counterpart shaping encoder 800. For example, the codebook store 820 of shaping decoder 1000 may be loaded with a copy of the above-described shaping codebook 900. A person of ordinary skill in the art will understand that, in some embodiments, shaping decoder 1000 may be adapted in a relatively straightforward manner to perform decoding that is inverse to the encoding of shaping encoder 700.

Figure 11:
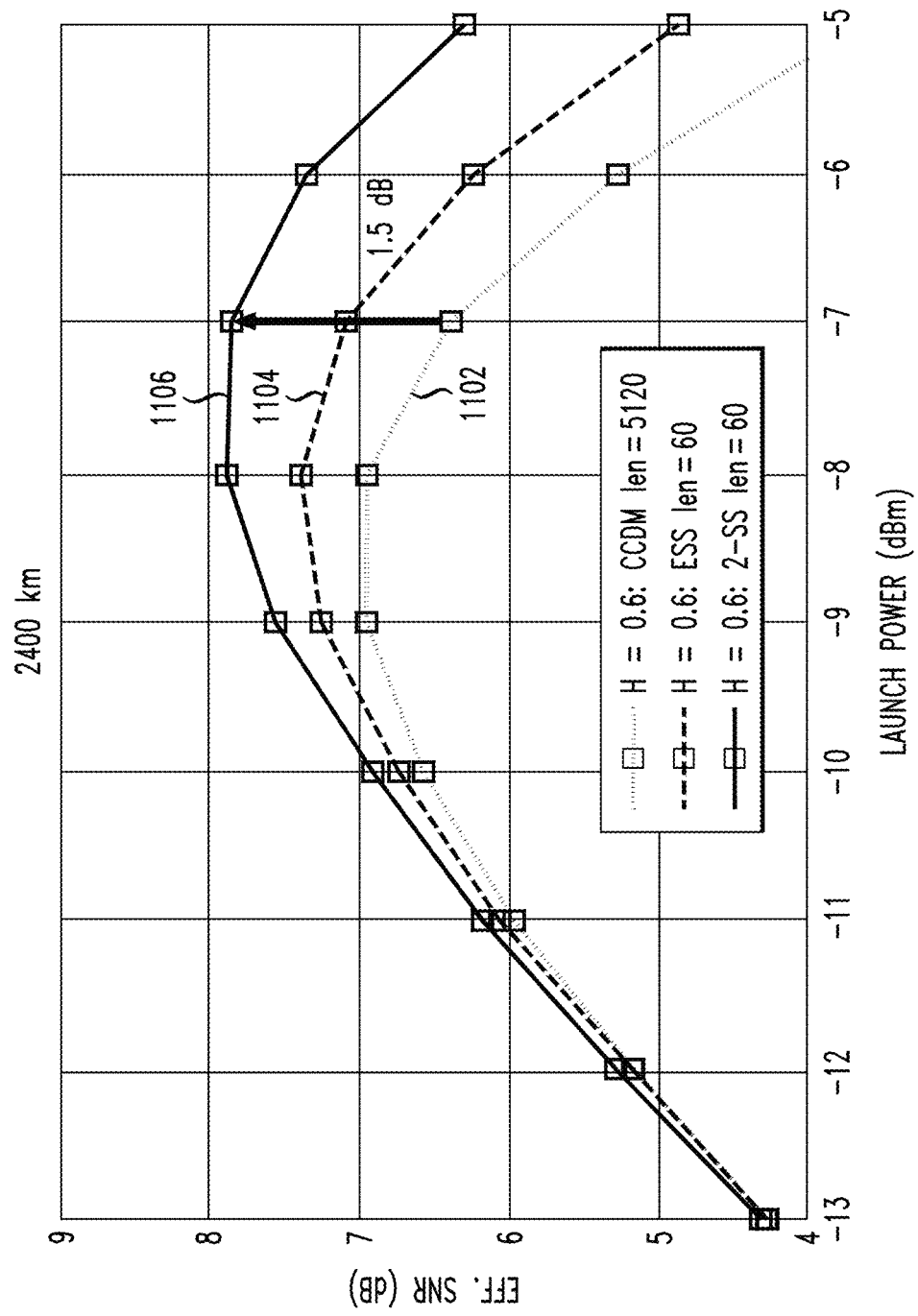
FIG. 11 graphically illustrates example signal-to-noise ratio (SNR) improvements that can be achieved in the communication system of FIG. 1 according to an embodiment.

FIG. 11 graphically illustrates example SNR improvements that can be achieved according to an embodiment. The SNR data shown in FIG. 11 represent computer simulations of a representative legacy dispersion-managed communication link 106. The optical launch power of −7 dBm corresponds to an approximately optimum launch power of the unshaped QPSK-modulated optical signal, which is typical of the legacy design target. A curve 1102 graphically shows SNR results corresponding to a 1-stage shaping algorithm implemented using the Constant Composition Distribution Matching (CCDM) described in the above-cited Schulte reference, with the shaping-code rate of H=0.6, the amplitude sequence lengths n=5,120, and the CCDM being configured to implement the MB distribution for a 4-PAM constellation. A curve 1104 graphically shows SNR results corresponding to a 1-stage shaping algorithm implemented using the Enumerative Sphere Shaping (ESS) described in the above-cited Gültekin reference, with the shaping-code rate of H=0.6 and the amplitude sequence lengths n=60 for the same 4-PAM constellation. A curve 1106 graphically shows SNR performance data corresponding to a 2-stage shaping (2-SS) algorithm implemented using a shaping codebook analogous to the above-described shaping codebook 900 but constructed for $n_2$=20. The higher SNR values of curve 1106 attest to the better performance of the 2-stage shaping algorithm with respect to either of the above-mentioned 1-stage shaping algorithms. For example, at the optical launch power of −7 dBm and transmission distance of 2400 km, the 2-stage sphere-shaping algorithm achieves ~1.5-dB gain in effective SNR relative to the MB CCDM shaping algorithm.

Figure 12:
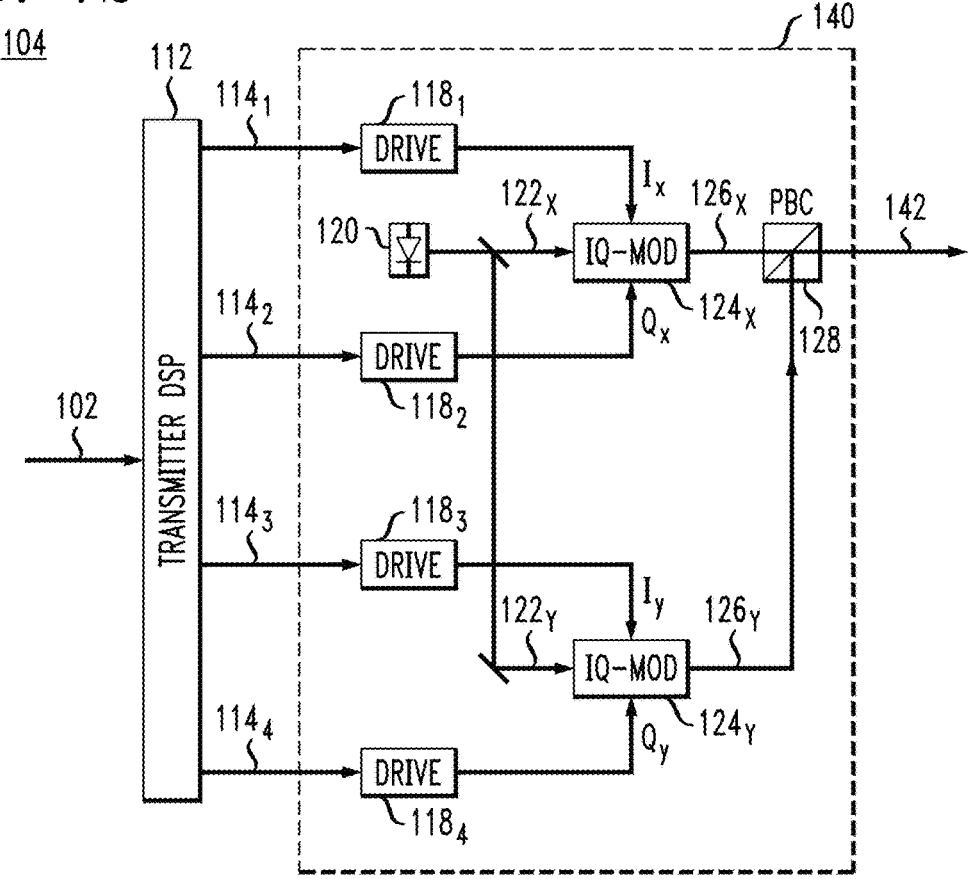
FIG. 12 shows a block diagram of an optical transmitter that can be used in the communication system of FIG. 1 according to an embodiment.

FIG. 12 shows a block diagram of optical transmitter 104 that can be used in system 100 (FIG. 1) according to an embodiment.

In operation, transmitter 104 receives input stream 102 of payload data and applies it to a digital signal processor (DSP) 112, which implements, inter alia, the electronic encoder 110 (FIG. 1). DSP 112 processes input data stream 102 to generate digital signals $114_1$-$114_4$. In an example embodiment, DSP 112 may perform, one or more of the following: (i) de-multiplex input stream 102 into two sub-streams, each intended for optical transmission using a respective one of orthogonal (e.g., X and Y) polarizations of optical output signal 142; (ii) encode each of the sub-streams using one or more suitable codes, e.g., as outlined above; and (iii) convert each of the two resulting sub-streams into a corresponding sequence of constellation symbols. In each signaling interval (also referred to as a symbol period or time slot), signals $114_1$ and $114_2$ carry digital values that represent the in-phase (I) component and quadrature (Q) component, respectively, of a corresponding constellation symbol intended for transmission using a first (e.g., X) polarization of light. Signals $114_3$ and $114_4$ similarly carry digital values that represent the I and Q components, respectively, of the corresponding constellation symbol intended for transmission using a second (e.g., Y) polarization of light.

E/O converter 140 operates to transform digital signals $114_1$-$114_4$ into a corresponding modulated optical output signal 142. More specifically, drive circuits $118_1$ and $118_2$ transform digital signals $114_1$ and $114_2$, as known in the art, into electrical analog drive signals $I_X$ and $Q_X$, respectively. Drive signals $I_X$ and $Q_X$ are then used, in a conventional manner, to drive an I-Q modulator $124_X$. In response to drive signals $I_X$ and $Q_X$, I-Q modulator $124_X$ operates to modulate an X-polarized beam $122_X$ of light supplied by a laser source 120 as indicated in FIG. 12, thereby generating a modulated optical signal $126_X$.

Drive circuits $118_3$ and $118_4$ similarly transform digital signals $114_3$ and $114_4$ into electrical analog drive signals $I_Y$ and $Q_Y$, respectively. In response to drive signals $I_Y$ and $Q_Y$, an I-Q modulator $124_Y$ operates to modulate a Y-polarized beam $122_Y$ of light supplied by laser source 120 as indicated in FIG. 12, thereby generating a modulated optical signal $126_Y$. A polarization beam combiner 128 operates to combine modulated optical signals $126_X$ and $126_Y$, thereby generating optical output signal 142 (also see FIG. 1).

Figure 13:
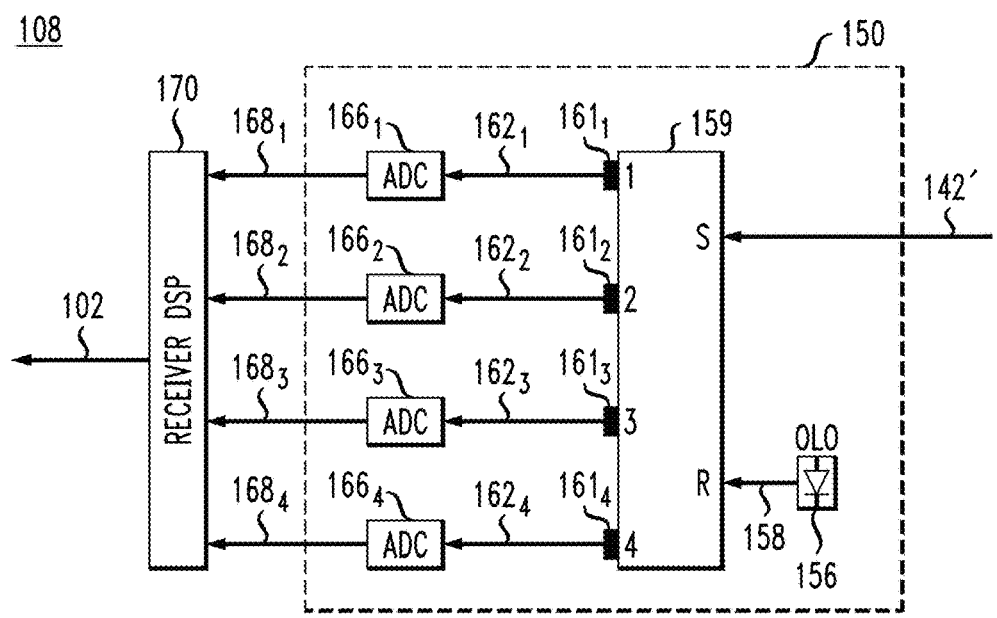
FIG. 13 shows a block diagram of an optical receiver that can be used in the communication system of FIG. 1 according to an embodiment.

FIG. 13 shows a block diagram of optical receiver 108 that can be used in system 100 (FIG. 1) according to an embodiment.

O/E converter 150 comprises an optical hybrid 159, light detectors $161_1$-$161_4$, analog-to-digital converters (ADCs) $166_1$-$166_4$, and an optical local-oscillator (OLO) source 156. Optical hybrid 159 has (i) two input ports labeled S and R and (ii) four output ports labeled 1 through 4. Input port S receives optical signal 142' (also see FIG. 1). Input port R receives an OLO signal 158 generated by OLO source 156. OLO signal 158 has an optical-carrier wavelength (frequency) that is sufficiently close to that of signal 142' to enable coherent (e.g., intradyne) detection of the latter signal. OLO signal 158 can be generated, e.g., using a relatively stable laser whose output wavelength (frequency) is approximately the same as the carrier wavelength (frequency) of optical signal 142.

In an example embodiment, optical hybrid 159 operates to mix input signal 142' and OLO signal 158 to generate different mixed (e.g., by interference) optical signals (not explicitly shown in FIG. 13). Light detectors $161_1$-$161_4$ then convert the mixed optical signals into four electrical signals $162_1$-$162_4$ that are indicative of complex values corresponding to two orthogonal-polarization components of signal 142'. For example, electrical signals $162_1$ and $162_2$ may be an analog I signal and an analog Q signal, respectively, corresponding to a first (e.g., horizontal, h) polarization component of signal 142'. Electrical signals $162_3$ and $162_4$ may similarly be an analog I signal and an analog Q signal, respectively, corresponding to a second (e.g., vertical, v) polarization component of signal 142'. Note that the orientation of the h and v polarization axes at receiver 108 may not coincide with the orientation of the X and Y polarization axes at transmitter 104.

Each of electrical signals $162_1$-$162_4$ is converted into digital form in a corresponding one of ADCs $166_1$-$166_4$. Optionally, each of electrical signals $162_1$-$162_4$ may be amplified in a corresponding electrical amplifier (not explicitly shown) prior to the resulting signal being converted into digital form. Digital signals $168_1$-$168_4$ produced by ADCs $166_1$-$166_4$ are then processed by a DSP 170, which implements, inter alia, electronic decoder 160 (see FIG. 1).

In an example embodiment, in addition to the above-described decoding, DSP 170 may perform one or more of the following: (i) signal processing directed at dispersion compensation; (ii) signal processing directed at compensation of nonlinear distortions; (iii) electronic polarization de-multiplexing; and (iv) FEC decoding.

According to an example embodiment disclosed above, e.g., in the summary section and/or in reference to any one or any combination of some or all of FIGS. 1-13, provided is an apparatus comprising: a digital encoder (e.g., 700, FIG. 7) having, at least, first and second digital stages (e.g., $610_1$, $710_2$, FIG. 7) to produce a stream of symbols (e.g., 712, FIG. 7) from a bitstream (e.g., $608_1$, FIG. 7), the first digital stage being configured to separately encode segments of a same number of bits (e.g., $k_1$) of the bitstream into first sequences of symbols such that each of the first sequences has a same first length (e.g., $n_1$) and a respective total energy of the symbols therein lower than a threshold (e.g., $E_1+\delta E$), the second digital stage being configured to encode blocks of the first sequences into second sequences of symbols, each of the blocks having a same number of first sequences therein, each of the second sequences having a same second length (e.g., $n_2$); and wherein a total energy of symbols of any of the second sequences divided by the second length is smaller than the threshold divided by the first length. Herein, $\delta E$ denotes an infinitesimal value, e.g., 0.01% of $E_1$.

In some embodiments of the above apparatus, the threshold is smaller than an average energy (e.g., $U_n$, Eq. (4)) of an unshaped sequence of symbols of the first length.

In some embodiments of any of the above apparatus, the second length is an integer multiple of the first length, the integer being two or more.

In some embodiments of any of the above apparatus, the first digital stage is configured to produce the first sequences such that symbols of larger energy are less common therein than symbols of lower energy.

In some embodiments of any of the above apparatus, the second stage is configured to produce the second sequences such that symbols of larger energy are less common therein than symbols of lower energy.

In some embodiments of any of the above apparatus, the threshold is smaller than an average energy of the symbols times the first length, the average being taken over a corresponding constellation of the symbols.

In some embodiments of any of the above apparatus, the digital encoder is configured to create the stream of symbols from the second sequences by using some of the bits of the bitstream as signs for the symbols.

In some embodiments of any of the above apparatus, the apparatus further comprises an optical modulator (e.g., 124, FIG. 12) and electronic driver thereof (e.g., 118, FIG. 12); and wherein the digital encoder is configured to cause the electronic driver to operate the optical modulator to produce a modulated optical carrier carrying the second sequences of symbols.

In some embodiments of any of the above apparatus, the second length is an integer multiple of the first length, the integer being three or more.

In some embodiments of any of the above apparatus, the second digital stage comprises a constellation demapper (e.g., $620_2$, FIG. 6) connected to receive the first sequences of symbols.

According to another example embodiment disclosed above, e.g., in the summary section and/or in reference to any one or any combination of some or all of FIGS. 1-13, provided is an apparatus comprising an optical data transmitter (e.g., 104, FIGS. 1, 12) that comprises an optical front end (e.g., 140, FIGS. 1, 12) and a digital shaping encoder (e.g., 110, FIG. 1; 112, FIG. 12, 600, FIG. 6; 700, FIG. 7; 800, FIG. 8), the digital shaping encoder being configured to: encode a bitstream (e.g., $608_1$, FIGS. 6, 7, 8) into a stream (e.g., 632, FIG. 6; 732, FIGS. 7, 8) of symbols of a constellation; and cause the optical front end to produce a modulated optical signal (e.g., 142, FIG. 1) carrying the stream of symbols; and wherein the shaping encoder is configured to generate a symbol sequence for the stream in response to a segment of the bitstream, the symbol sequence including an integer number (e.g., $\rho=n_2/n_1$) of non-overlapping subsequences of a fixed length (e.g., $n_1$), any one of the subsequences having a transmit energy not exceeding a first threshold energy (e.g., $E_1$), the symbol sequence having a transmit energy not exceeding a second threshold energy (e.g., $E_2$) and being generated such that some symbols of higher energy have a lower probability of being generated by the digital shaping encoder than other symbols of lower energy, the first threshold energy being smaller than an average energy (e.g., $U_n$, Eq. (4)) of an unshaped sequence of the fixed length of the symbols of the constellation, the second threshold energy being smaller than the integer number of the first threshold energies (e.g., Eq. (5)), the integer number being greater than one.

In some embodiments of the above apparatus, the digital shaping encoder comprises a first shaping stage (e.g., $602_1$, FIG. 6) and at least a second shaping stage (e.g., $602_2$, FIG. 6), the first shaping stage being configured to generate a first amplitude stream (e.g., $612_1$, FIG. 6) in response to the bitstream, the first amplitude stream being a stream of non-overlapping amplitude sequences of the fixed length, each one of the amplitude sequences having an energy not exceeding the first threshold energy; and wherein the digital shaping encoder is configured to generate the symbol sequence based on the first amplitude stream.

In some embodiments of any of the above apparatus, the second shaping stage comprises a constellation demapper (e.g., $620_2$, FIG. 6) connected to receive the first amplitude stream.

In some embodiments of any of the above apparatus, the second shaping stage is configured to generate a second amplitude stream (e.g., $612_2$, FIG. 6) in response to the first amplitude stream, the second amplitude stream being a stream of non-overlapping amplitude sequences of a larger second fixed length, each one of the amplitude sequences of said second fixed length having an energy not exceeding the second threshold energy; and wherein the digital shaping encoder is configured to generate the symbol sequence based on the second amplitude stream.

In some embodiments of any of the above apparatus, the shaping encoder comprises a memory (e.g., 820, FIG. 8) having stored therein a codebook (e.g., 900, generated in accordance with FIGS. 9A-9D) for converting different segments of the bitstream into corresponding different amplitude sequences, each of the amplitude sequences having an energy not exceeding the second threshold energy and having a length equal to a product of the integer number and the fixed length.

In some embodiments of any of the above apparatus, the digital shaping encoder comprises a first shaping stage (e.g., $602_1$, FIG. 6) and at least a second shaping stage (e.g., $602_2$, FIG. 6), the first shaping stage being nested in the second shaping stage, the first shaping stage being configured to apply a first shaping code to the segment of the bitstream, the second shaping stage being configured to apply a second shaping code to the segment of the bitstream, the second shaping code having a smaller code rate than the first shaping code (e.g., $k/n_2 < k/n_1$).

In some embodiments of any of the above apparatus, the integer number is greater than ten.

According to yet another example embodiment disclosed above, e.g., in the summary section and/or in reference to any one or any combination of some or all of FIGS. 1-13, provided is an apparatus comprising an optical data transmitter (e.g., 104, FIGS. 1, 12) that comprises an optical front end (e.g., 140, FIGS. 1, 12) and a digital signal processor (e.g., 110, FIG. 1; 112, FIG. 12), the digital signal processor being configured to: encode a bitstream (e.g., $608_1$, FIGS. 6, 7, 8) to generate a stream (e.g., 632, FIG. 6; 732, FIGS. 7, 8) of symbols of a constellation; and drive the optical front end to cause a modulated optical signal (e.g., 142, FIG. 1) generated by the optical front end to carry the symbols of the stream; and wherein the digital signal processor comprises a shaping encoder (e.g., 600, FIG. 6; 700, FIG. 7; 800, FIG. 8) configured to generate a symbol sequence for the stream in response to a segment of the bitstream, the symbol sequence including an integer number (e.g., $\rho=n_2/n_1$) of non-overlapping subsequences of a fixed length (e.g., $n_1$), any one of the subsequences having a transmit energy not exceeding a first threshold energy (e.g., $E_1$), the symbol sequence having a transmit energy not exceeding a second threshold energy (e.g., $E_2$) and being generated such that some symbols of higher energy have a lower probability of being generated by the shaping encoder than other symbols of lower energy, the first threshold energy being smaller than an average energy (e.g., $U_n$, Eq. (4)) of an unshaped sequence of the fixed length of the symbols of the constellation, the second threshold energy being smaller than the integer number of the first threshold energies (e.g., Eq. (5)), the integer number being greater than one.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Unless otherwise specified herein, in addition to its plain meaning, the conjunction "if" may also or alternatively be construed to mean "when" or "upon" or "in response to determining" or "in response to detecting," which construal may depend on the corresponding specific context. For example, the phrase "if it is determined" or "if [a stated condition] is detected" may be construed to mean "upon determining" or "in response to determining" or "upon detecting [the stated condition or event]" or "in response to detecting [the stated condition or event]."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus, comprising:
    a digital encoder having, at least, first and second digital stages to produce a stream of symbols from a bitstream, the first digital stage being configured to separately encode segments of a same number of bits of the bitstream into first sequences of symbols such that each of the first sequences has a same first length and a respective total energy of the symbols therein lower than a threshold, the second digital stage being configured to encode blocks of the first sequences into second sequences of symbols, each of the blocks having a same number of the first sequences therein, each of the second sequences having a same second length; and
    wherein a total energy of the symbols of any of the second sequences divided by the second length is smaller than the threshold divided by the first length; and
    wherein the second digital stage comprises a constellation demapper connected to receive the first sequences of symbols.

2. The apparatus of claim 1, wherein the threshold is smaller than an average energy of an unshaped sequence of symbols of the first length.

3. The apparatus of claim 1, wherein the second length is an integer multiple of the first length, the integer being two or more.

4. The apparatus of claim 1, wherein the first digital stage is configured to produce the first sequences such that symbols of larger energy are less common therein than symbols of lower energy.

5. The apparatus of claim 4, wherein the second digital stage is configured to produce the second sequences such that symbols of larger energy are less common therein than symbols of lower energy.

6. The apparatus of claim 4, further comprising an optical modulator and electronic driver thereof; and
    wherein the digital encoder is configured to cause the electronic driver to operate the optical modulator to produce a modulated optical carrier carrying the second sequences of symbols.

7. The apparatus of claim 1, wherein the threshold is smaller than an average energy of the symbols times the first length, the average being taken over a corresponding constellation of the symbols.

8. The apparatus of claim 7, further comprising an optical modulator and electronic driver thereof; and
    wherein the digital encoder is configured to cause the electronic driver to operate the optical modulator to produce a modulated optical carrier carrying the second sequences of symbols.

9. The apparatus of claim 1, wherein the digital encoder is configured to create the stream of symbols from the second sequences of symbols by using some of the bits of the bitstream as signs for the symbols.

10. The apparatus of claim 9, further comprising an optical modulator and an electronic driver thereof; and
    wherein the digital encoder is configured to cause the electronic driver to operate the optical modulator to produce a modulated optical carrier carrying the stream of symbols.

11. The apparatus of claim 1, further comprising an optical modulator and electronic driver thereof; and
    wherein the digital encoder is configured to cause the electronic driver to operate the optical modulator to produce a modulated optical carrier carrying the second sequences of symbols.

12. The apparatus of claim 1, wherein the second length is an integer multiple of the first length, the integer being three or more.

13. An apparatus comprising an optical data transmitter that comprises an optical front end and a digital shaping encoder, the digital shaping encoder being configured to:
    encode a bitstream into a stream of symbols of a constellation; and
    cause the optical front end to produce a modulated optical signal carrying the stream of symbols; and
    wherein the digital shaping encoder is configured to generate a symbol sequence for the stream in response to a segment of the bitstream, the symbol sequence including an integer number of non-overlapping subsequences of a fixed length, any one of the subsequences having a transmit energy not exceeding a first threshold energy, the symbol sequence having a transmit energy not exceeding a second threshold energy and being generated such that some symbols of higher energy have a lower probability of being generated by the digital shaping encoder than other symbols of lower energy, the first threshold energy being smaller than an average energy of an unshaped sequence of the fixed length of the symbols of the constellation, the second threshold energy being smaller than the integer number of the first threshold energies, the integer number being greater than one.

14. The apparatus of claim 13,
    wherein the digital shaping encoder comprises a first shaping stage and at least a second shaping stage, the first shaping stage being configured to generate a first amplitude stream in response to the bitstream, the first amplitude stream being a stream of non-overlapping amplitude sequences of the fixed length, each one of the amplitude sequences having an energy not exceeding the first threshold energy; and
    wherein the digital shaping encoder is configured to generate the symbol sequence based on the first amplitude stream.

15. The apparatus of claim 14, wherein the second shaping stage comprises a constellation demapper connected to receive the first amplitude stream.

16. The apparatus of claim 14,
wherein the second shaping stage is configured to generate a second amplitude stream in response to the first amplitude stream, the second amplitude stream being a stream of non-overlapping amplitude sequences of a larger second fixed length, each one of the amplitude sequences of said second fixed length having an energy not exceeding the second threshold energy; and
wherein the digital shaping encoder is configured to generate the symbol sequence based on the second amplitude stream.

17. The apparatus of claim 13, wherein the shaping encoder comprises a memory having stored therein a codebook for converting different segments of the bitstream into corresponding different amplitude sequences, each of the amplitude sequences having an energy not exceeding the second threshold energy and having a length equal to a product of the integer number and the fixed length.

18. The apparatus of claim 13, wherein the digital shaping encoder comprises a first shaping stage and at least a second shaping stage, the first shaping stage being nested in the second shaping stage, the first shaping stage being configured to apply a first shaping code to the segment of the bitstream, the second shaping stage being configured to apply a second shaping code to the segment of the bitstream, the second shaping code having a smaller code rate than the first shaping code.

19. The apparatus of claim 13, wherein the integer number is greater than ten.

20. An apparatus, comprising:
a digital encoder having, at least, first and second digital stages to produce a stream of symbols from a bitstream, the first digital stage being configured to separately encode segments of a same number of bits of the bitstream into first sequences of symbols such that each of the first sequences has a same first length and a respective total energy of the symbols therein lower than a threshold, the second digital stage being configured to encode blocks of the first sequences into second sequences of symbols, each of the blocks having a same number of the first sequences therein, each of the second sequences having a same second length;
wherein a total energy of the symbols of any of the second sequences divided by the second length is smaller than the threshold divided by the first length; and
wherein the threshold is smaller than at least one of (i) an average energy of the symbols times the first length where the average is taken over a corresponding constellation of the symbols and (ii) an average energy of an unshaped sequence of symbols of the first length.

21. The apparatus of claim 20, wherein the threshold is smaller than an average energy of an unshaped sequence of symbols of the first length.

22. The apparatus of claim 20, wherein the threshold is smaller than an average energy of the symbols times the first length, the average being taken over a corresponding constellation of the symbols.

23. The apparatus of claim 20, further comprising an optical modulator and electronic driver thereof; and
wherein the digital encoder is configured to cause the electronic driver to operate the optical modulator to produce a modulated optical carrier carrying the second sequences of symbols.

* * * * *